United States Patent
Yoo et al.

(10) Patent No.: US 11,653,228 B2
(45) Date of Patent: May 16, 2023

(54) CHANNEL STATE INFORMATION (CSI) LEARNING

(71) Applicant: QUALCOMM Incorporated, San Diego, CA (US)

(72) Inventors: Taesang Yoo, San Diego, CA (US); Pavan Kumar Vitthaladevuni, San Diego, CA (US); Naga Bhushan, San Diego, CA (US); June Namgoong, San Diego, CA (US); Krishna Kiran Mukkavilli, San Diego, CA (US); Tingfang Ji, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/181,934

(22) Filed: Feb. 22, 2021

(65) Prior Publication Data
US 2021/0266763 A1 Aug. 26, 2021

Related U.S. Application Data

(60) Provisional application No. 62/980,907, filed on Feb. 24, 2020.

(51) Int. Cl.
*H04W 24/02* (2009.01)
*H04W 24/08* (2009.01)
*H04B 7/06* (2006.01)

(52) U.S. Cl.
CPC .......... *H04W 24/02* (2013.01); *H04B 7/0626* (2013.01); *H04W 24/08* (2013.01)

(58) Field of Classification Search
CPC .... H04W 24/02; H04W 24/08; H04B 7/0626; H04B 7/0417; H04L 1/0026;
(Continued)

(56) References Cited

U.S. PATENT DOCUMENTS 10,644,916 B1 * 5/2020 Shattil .................. H04B 7/0456
2016/0254889 A1 * 9/2016 Shattil .................. H04J 13/004
370/329
(Continued)

OTHER PUBLICATIONS

Chen J., et al., "Hybrid Beamforming/Combining for Millimeter Wave MIMO: A Machine Learning Approach", Draft submitted to IEEE Journal on Selected Areas in Communications, ARXIV, ORG, Cornell University Library, 201 Olin Library Cornell University Ithaca, NY 14853, Oct. 15, 2019 (Oct. 15, 2019), XP081515683.
(Continued)

*Primary Examiner* — Abdullahi Ahmed
(74) *Attorney, Agent, or Firm* — Seyfarth Shaw LLP

(57) ABSTRACT

A method of wireless communication by a user equipment (UE) receives a channel state information (CSI) decoder and CSI encoder from a base station on a physical downlink control channel (PDSCH) or a media access control-control element (MAC-CE). The method also includes training the CSI decoder and CSI encoder based on observed channel and interference conditions to obtain updated decoder coefficients and updated encoder coefficients. The method further includes receiving an indication of resources for transmission of the updated encoder coefficients and updated decoder coefficients. The method includes transmitting the updated decoder coefficients and updated encoder coefficients to the base station in accordance with the indication of resources. Further, the method includes receiving an updated CSI decoder and updated CSI encoder from the base station for further training.

21 Claims, 10 Drawing Sheets

(58) Field of Classification Search
CPC .... H04L 1/0029; G06N 3/0454; G06N 3/084; G06N 3/0445; G06N 3/0472
See application file for complete search history.

(56) References Cited

U.S. PATENT DOCUMENTS

| | | | | |
|---|---|---|---|---|
| 2018/0367192 | A1* | 12/2018 | O'Shea | H04B 7/0413 |
| 2021/0266787 | A1* | 8/2021 | Yoo | H04W 24/10 |
| 2021/0273707 | A1* | 9/2021 | Yoo | H04B 7/0658 |
| 2022/0060887 | A1* | 2/2022 | Vitthaladevuni | H03M 7/6047 |
| 2022/0094411 | A1* | 3/2022 | Yoo | H04L 25/0254 |

OTHER PUBLICATIONS

International Search Report and Written Opinion—PCT/US2021/019278—ISA/EPO—dated Jun. 8, 2021.
Liao Y., et al., "CSI Feedback Based on Deep Learning for Massive MIMO Systems", IEEE Access, vol. 7, Jun. 24, 2019 (Jun. 24, 2019), XP011734696, pp. 86810-86820, DOI: 10.1109/ACCESS.2019.2924673 [retrieved on Jul. 12, 2019].

\* cited by examiner

CHANNEL STATE INFORMATION (CSI) LEARNING

CROSS-REFERENCE TO RELATED APPLICATION

The present application claims priority to U.S. Provisional Patent Application No. 62/980,907, filed on Feb. 24, 2020, and titled "CHANNEL STATE INFORMATION (CSI) LEARNING," the disclosure of which is expressly incorporated by reference herein in its entirety.

FIELD OF THE DISCLOSURE

Aspects of the present disclosure generally relate to wireless communications, and more particularly to techniques and apparatuses for federated channel state information (CSI) learning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunications standards that employ these technologies.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In some aspects of the present disclosure, a method of wireless communication by a user equipment (UE) may include receiving a channel state information (CSI) decoder and CSI encoder from a base station on a physical downlink control channel (PDSCH) or a media access control-control element (MAC-CE). The method may also include training the CSI decoder and CSI encoder based on observed channel and interference conditions to obtain updated decoder coefficients and updated encoder coefficients. The method may further include receiving an indication of resources for transmission of the updated encoder coefficients and updated decoder coefficients. The method includes transmitting the updated decoder coefficients and updated encoder coefficients to the base station in accordance with the indication of resources. Further, the method includes receiving an updated CSI decoder and updated CSI encoder from the base station for further training.

In some aspects, a method of wireless communication by a base station includes transmitting a channel state information (CSI) decoder and a CSI encoder to multiple user equipments (UEs) via a physical downlink control channel (PSDCH) or a media access control-control element (MAC-CE). The method may also include assigning resources for receiving updated CSI coefficients for the CSI decoder and CSI encoder. The method also includes receiving updated CSI coefficients from the plurality of UEs in accordance with the assigned resources. The method further includes extracting weights of common layers associated with the updated coefficients for a subset of UEs. The method generates updated common weights for the CSI encoder and CSI decoder based on the extracted weights. Further, the method also distributes the updated common weights to the subset of UEs.

An apparatus for a user equipment (UE) for wireless communication may include a memory and one or more processors operatively coupled to the memory. The memory and the processor(s) may receive a channel state information (CSI) decoder and CSI encoder from a base station on a physical downlink control channel (PDSCH) or a media access control-control element (MAC-CE). The UE may train the CSI decoder and CSI encoder based on observed channel and interference conditions to obtain updated decoder coefficients and updated encoder coefficients. The UE may also receive an indication of resources for transmission of the updated encoder coefficients and updated decoder coefficients. The UE may further transmit the updated decoder coefficients and updated encoder coefficients to the base station in accordance with the indication of resources. The UE may also receive an updated CSI decoder and updated CSI encoder from the base station for further training.

An apparatus for a base station for wireless communication may include a memory and one or more processors operatively coupled to the memory. The memory and the processor(s) may transmit a channel state information (CSI) decoder and a CSI encoder to multiple user equipments (UEs) via a physical downlink control channel (PSDCH) or a media access control-control element (MAC-CE). The base station may assign resources for receiving updated CSI coefficients for the CSI decoder and CSI encoder. The base station may receive updated CSI coefficients from the UEs in accordance with the assigned resources. The base station may also extract weights of common layers associated with the updated coefficients for a subset of UEs. The base station may further generate updated common weights for the CSI encoder and CSI decoder based on the extracted weights. The base station may also distribute the updated common weights to the subset of UEs.

A user equipment (UE) for wireless communication may include means for receiving a channel state information (CSI) decoder and CSI encoder from a base station on a physical downlink control channel (PDSCH) or a media access control-control element (MAC-CE). The UE may also include means for training the CSI decoder and CSI encoder based on observed channel and interference conditions to obtain updated decoder coefficients and updated encoder coefficients. The UE may further include means for receiving an indication of resources for transmission of the updated encoder coefficients and updated decoder coefficients. The UE includes means for transmitting the updated decoder coefficients and updated encoder coefficients to the base station in accordance with the indication of resources. Further, the UE includes means for receiving an updated CSI decoder and updated CSI encoder from the base station for further training.

A base station for wireless communication may include means for transmitting a channel state information (CSI) decoder and a CSI encoder to multiple user equipments (UEs) via a physical downlink control channel (PSDCH) or a media access control-control element (MAC-CE). The base station may also include means for assigning resources for receiving updated CSI coefficients for the CSI decoder and CSI encoder. The base station also includes means for receiving updated CSI coefficients from the plurality of UEs in accordance with the assigned resources. The base station further includes means for extracting weights of common layers associated with the updated coefficients for a subset of UEs. The base station includes means for generating updated common weights for the CSI encoder and CSI decoder based on the extracted weights. Further, the UE includes means for distributing the updated common weights to the subset of UEs.

A non-transitory computer-readable medium may include program code executed by a user equipment processor. The medium may include program code to transmit a channel state information (CSI) decoder and a CSI encoder to multiple user equipments (UEs) via a physical downlink control channel (PSDCH) or a media access control-control element (MAC-CE).

The medium may include program code to receive a channel state information (CSI) decoder and CSI encoder from a base station on a physical downlink control channel (PDSCH) or a media access control-control element (MAC-CE). The medium may include program code to train the CSI decoder and CSI encoder based on observed channel and interference conditions to obtain updated decoder coefficients and updated encoder coefficients. The medium may also include program code to receive an indication of resources for transmission of the updated encoder coefficients and updated decoder coefficients. The medium may further include program code to transmit the updated decoder coefficients and updated encoder coefficients to the base station in accordance with the indication of resources. The medium may also include program code to receive an updated CSI decoder and updated CSI encoder from the base station for further training.

A non-transitory computer-readable medium may include program code executed by a base station. The medium may include program code to assign resources for receiving updated CSI coefficients for the CSI decoder and CSI encoder. The medium may include program code to receive updated CSI coefficients from the UEs in accordance with the assigned resources. The medium may also include program code to extract weights of common layers associated with the updated coefficients for a subset of UEs. The medium may further include program code to generate updated common weights for the CSI encoder and CSI decoder based on the extracted weights. The medium may also include program code to distribute the updated common weights to the subset of UEs.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Figure 1:
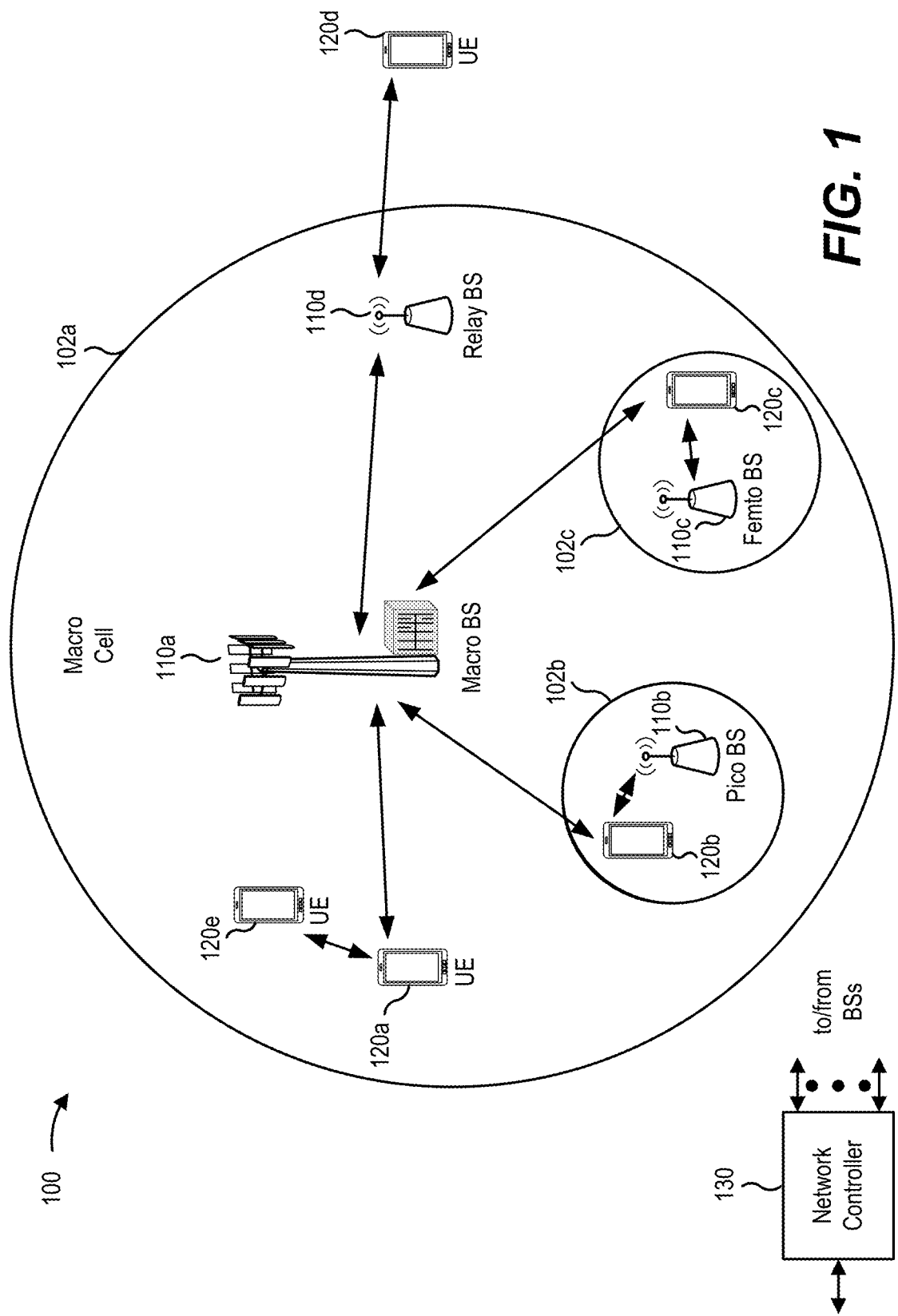
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
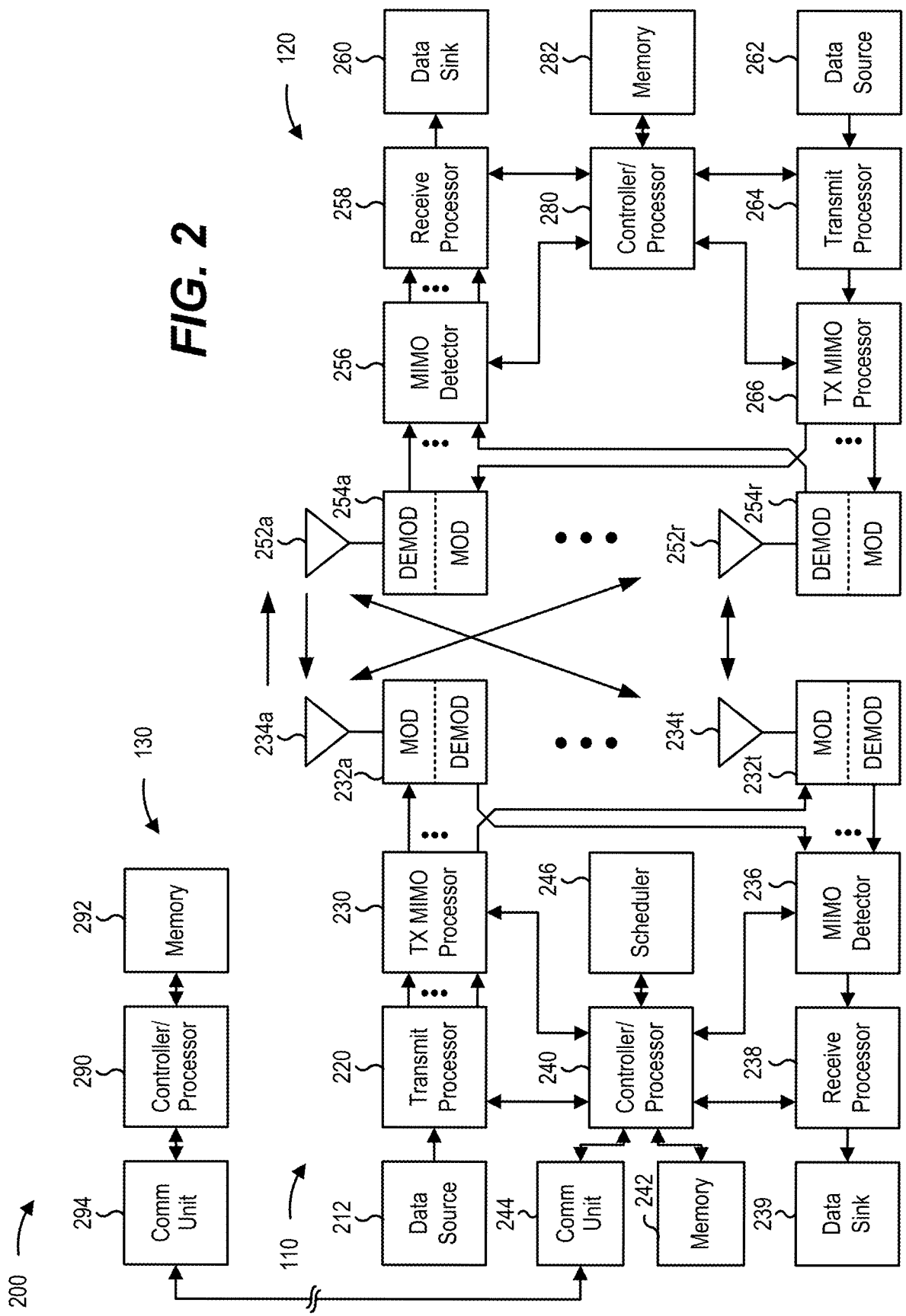
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communications unit 244 and communicate to network controller 130 via communications unit 244. Network controller 130 may include communications unit 294, controller/processor 290, and memory 292.

Controller/processor 240 of base station 110, controller/processor 280 of UE 120, and/or any other component(s) of FIG. 2 may perform one or more techniques associated with federated CSI learning, as described in more detail elsewhere. For example, controller/processor 240 of base station 110, controller/processor 280 of UE 120, and/or any other component(s) of FIG. 2 may perform or direct operations of, for example, the processes 800, 900 of FIGS. 8 and 9 and/or other processes as described. Memories 242 and 282 may store data and program codes for base station 110 and UE 120, respectively. A scheduler 246 may schedule UEs for data transmission on the downlink and/or uplink.

In some aspects, UE 120 may include means for receiving, means for training, means for transmitting, means for assigning, means for extracting weights, means for generating updated common weights, and means for distributing the updated common weights. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
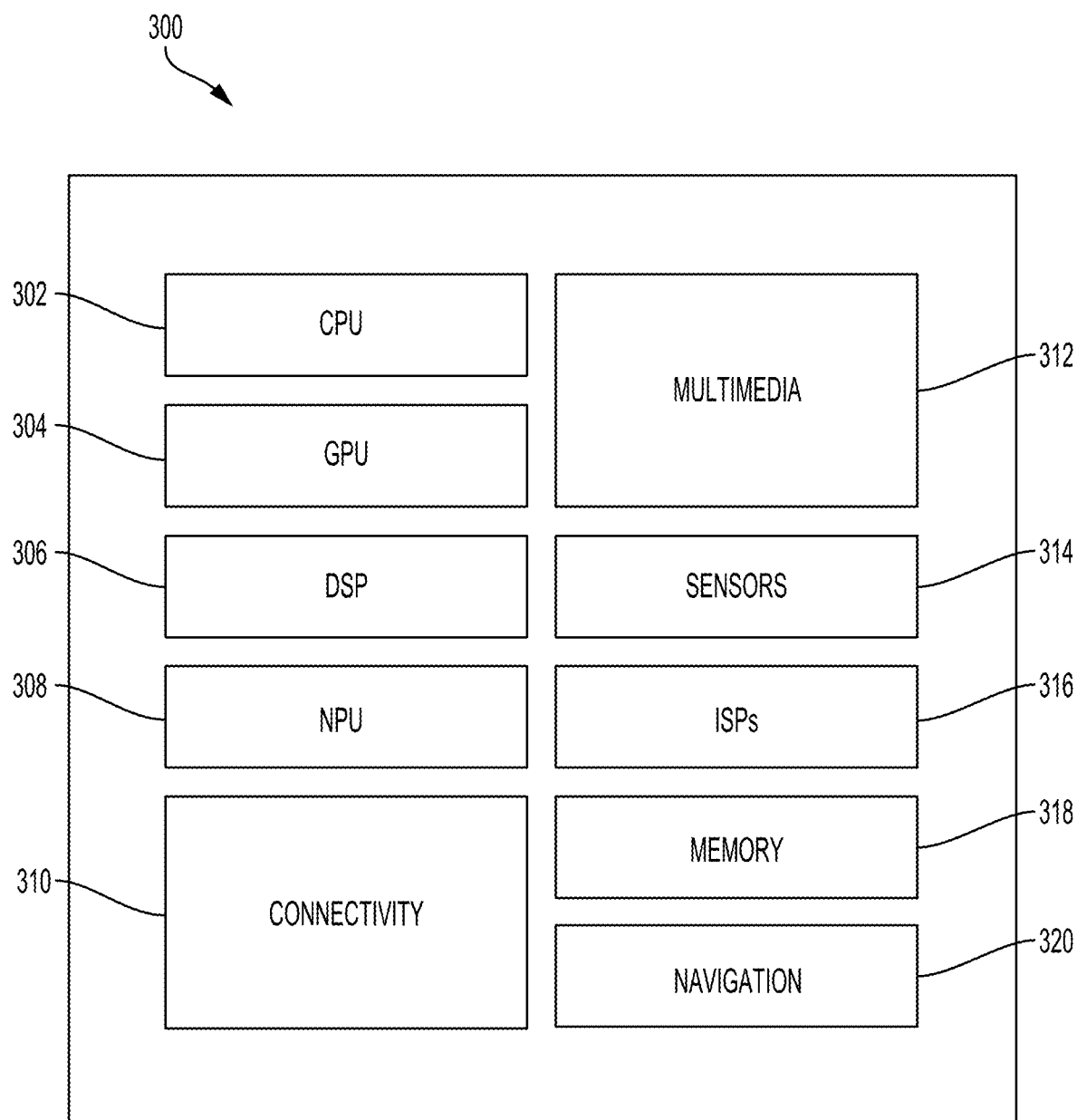
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for federated CSI learning, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive a channel state information (CSI) decoder and CSI encoder from a base station on physical downlink control channel (PDSCH) or a media access control-control element (MAC-CE). The instructions loaded into the general-purpose processor 302 may also include code to train the CSI decoder and CSI encoder based on observed channel and interference conditions to obtain updated decoder coefficients and updated encoder coefficients. The instructions loaded into the general-purpose processor 302 may also include code to receive an indication of resources for transmission of the updated encoder coefficients and updated decoder coefficients; and code to transmit the updated decoder coefficients and updated encoder coefficients to the base station in accordance with the indication of resources. The instructions loaded into the general-purpose processor 302 may also include code to receive an updated CSI decoder and updated CSI encoder from the base station, for further training.

In another aspect, the instructions loaded into the general-purpose processor 302 may also include code to assign resources for receiving updated CSI coefficients for the CSI decoder and CSI encoder; code to receive updated CSI coefficients from the plurality of UEs, in accordance with the assigned resources; and code to extract weights of common layers associated with the updated coefficients for a subset of UEs. The instructions loaded into the general-purpose processor 302 may also include code to generate updated common weights for the CSI encoder and CSI decoder based on the extracted weights; and code to distribute the updated common weights to the subset of UEs.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
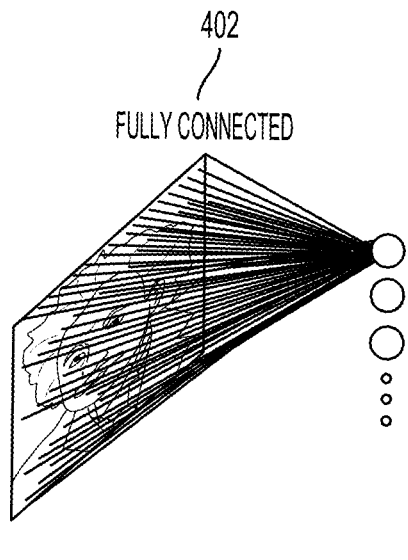
FIGS. 4A, 4B, and 4C are diagrams illustrating a neural network, in accordance with aspects of the present disclosure.
Figure 4B:
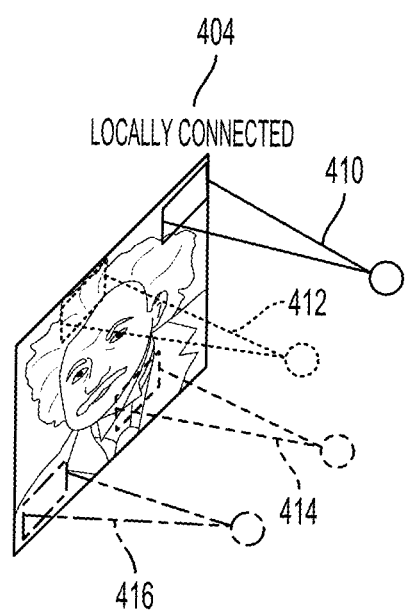

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
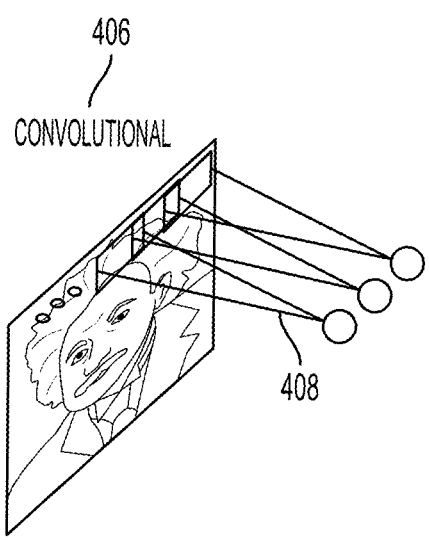

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
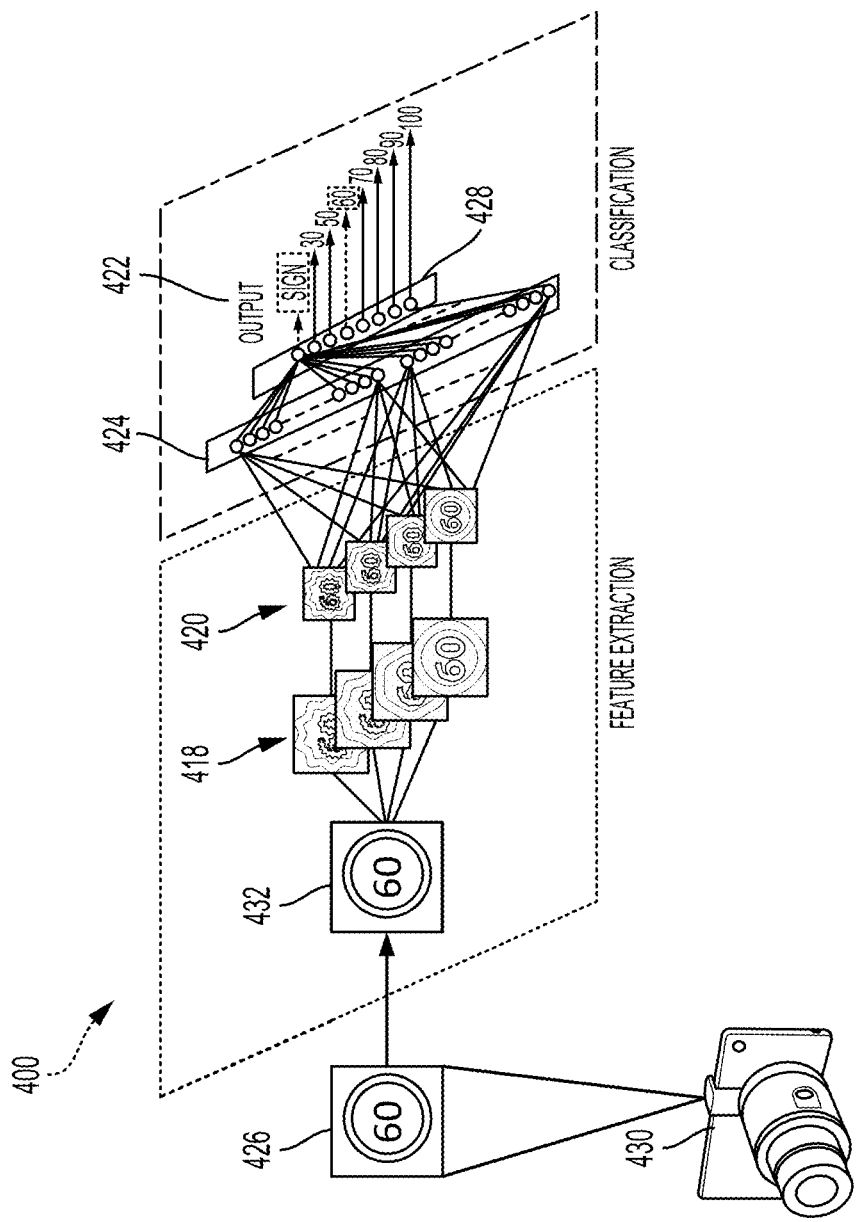
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
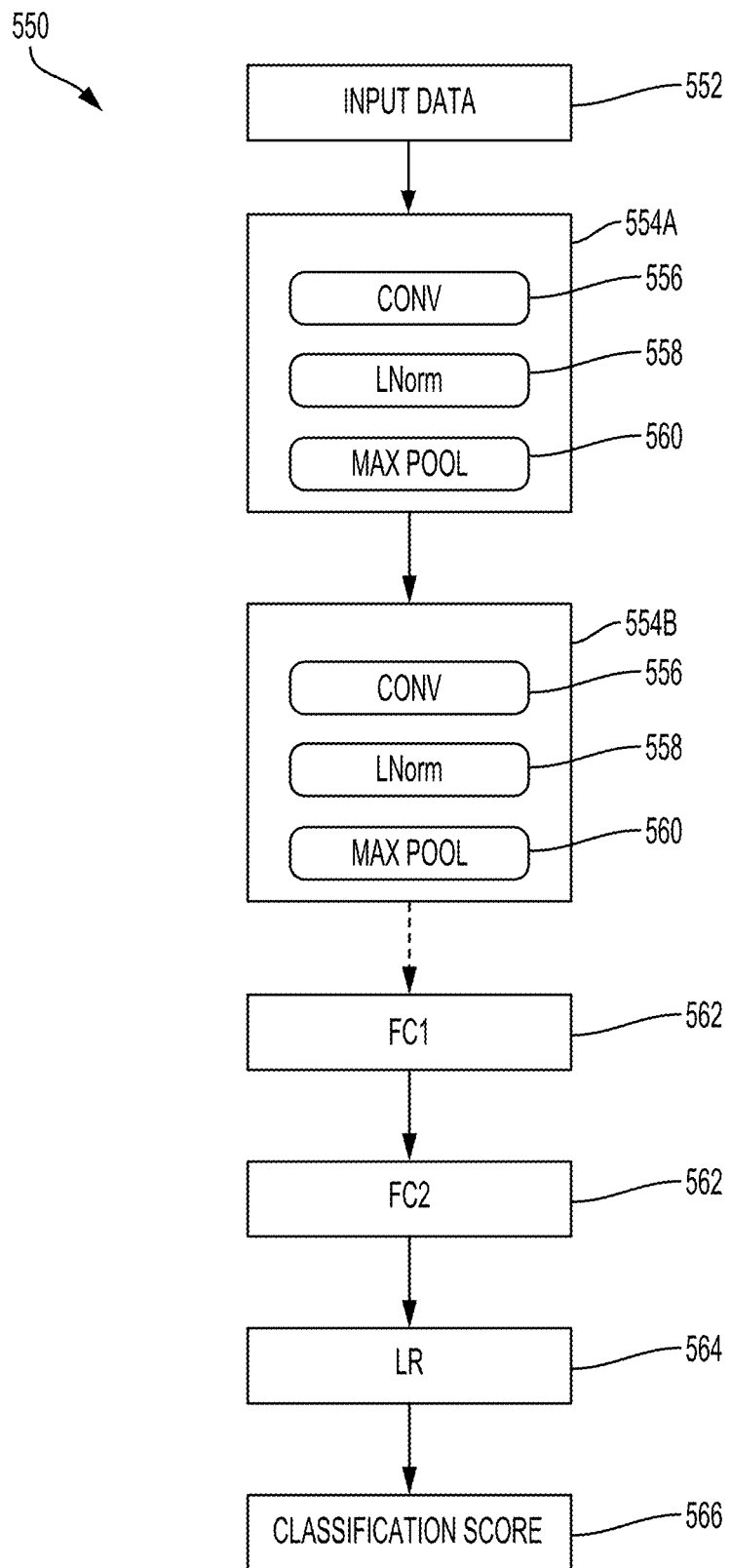
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Artificial intelligence (AI)/machine learning (ML) algorithms can improve wireless communications. An AI/ML module can run at the UE, the base station or in the case of distributed algorithms, jointly across the UE and base station. In an auto-encoder scenario, joint training may occur across the UE and the base station.

Massive multiple-input multiple-output (MIMO) systems are an important area for 5G and later systems. To implement massive MIMO, downlink channel state information (CSI) is analyzed by a base station, having hundreds or even thousands of centralized or distributed antennas, to address inter-user interference and to increase channel capacity. CSI measurements are made at the UE based on signals, such as CSI-RS, received from the base station. The downlink CSI measurements are fed back from the UEs to the base station for processing.

The large amount of CSI feedback can be compressed with neural network processing, for example, with an auto-encoder at the UE. The UE can encode the channel state feedback and transmit the encoded feedback over the air to the base station. The channel state feedback can be sent from the UE in accordance with timelines configured by radio resource control (RRC) signaling. Upon receiving the information, the base station feeds the received compressed channel state feedback values into the decoder to approximate the channel state feedback.

Figure 6:
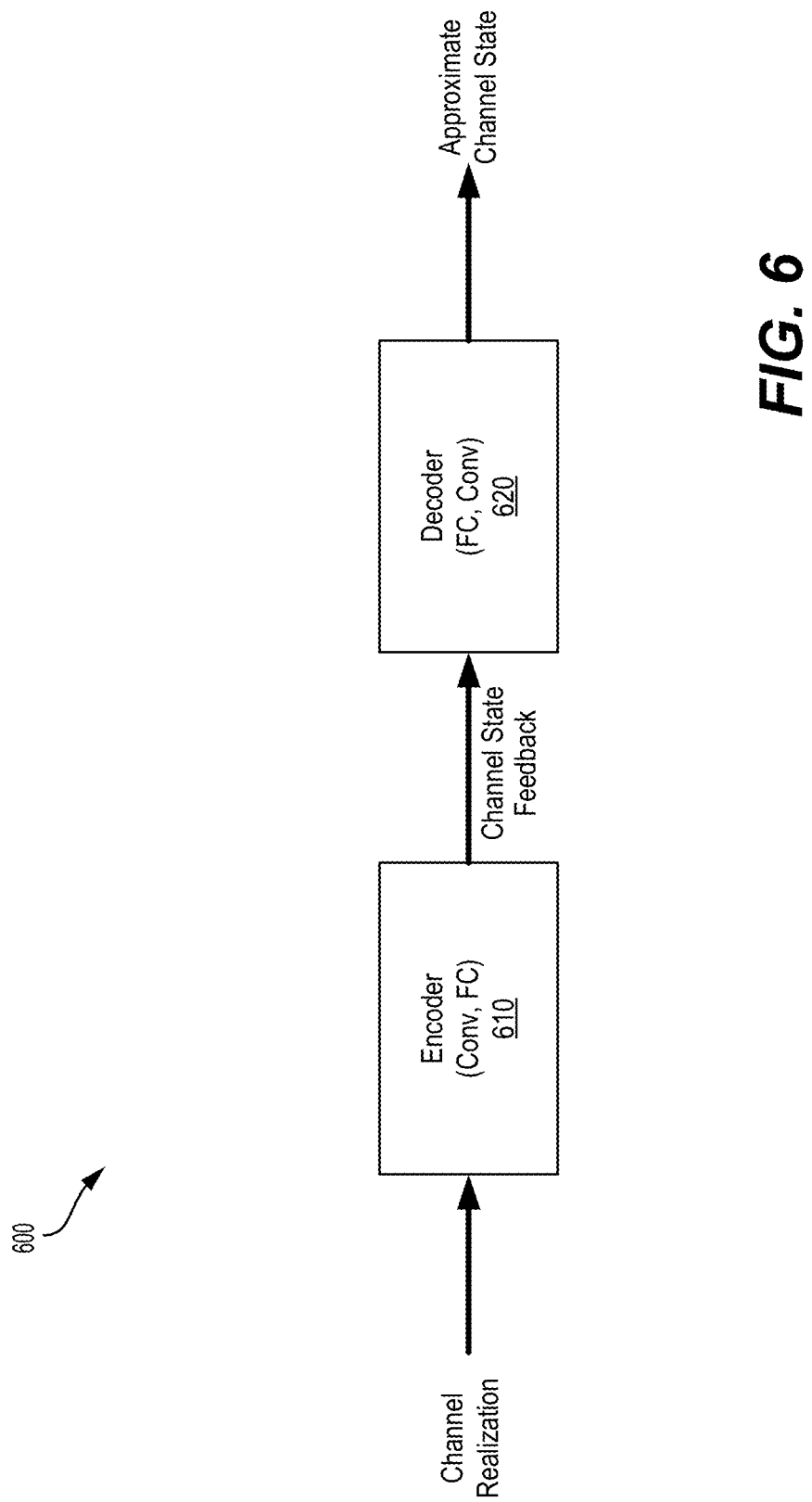
FIG. 6 is a block diagram illustrating an exemplary auto-encoder, in accordance with aspects of the present disclosure.

FIG. 6 is a block diagram illustrating an exemplary auto-encoder 600, in accordance with aspects of the present disclosure. The auto-encoder 600 includes an encoder 610 having a convolutional layer (Cony) and a fully connected layer (FC). The encoder 610 receives the channel realization and/or interference realization as an input and compresses the channel/interference realization. The channel realization can also be referred to as a channel estimate. The interference realization can also be referred to as an interference estimate. Interference depends upon the environment and can address uplink interference or inter-stream interference in MIMO scenarios.

The compressed channel state feedback is output from the encoder 610. The auto-encoder 600 also has a decoder 620 that receives the compressed channel state feedback output from the encoder 610. The decoder 620 passes the received information through a fully connected layer and a series of convolutional layers to recover the channel state (e.g., approximate channel state).

The UE trains the encoder 610 and decoder 620 and occasionally transmits the decoder coefficients to the base station. At a higher frequency, the UE sends the outputs of the encoder 610 (e.g., channel state feedback or compressed output of the encoder 610) to the base station. As the UE moves from location to location, the weights of the decoder 620 may change. That is, when the channel environment changes, the decoder weights (e.g., coefficients) may change. Updated decoder coefficients can thus be fed back to the base station from the UE to reflect the changing environment. In other words, the UE can train the decoder, and not just the encoder, based on the existing environment. The coefficients can be sent from the UE in accordance with timelines configured by RRC signaling. In one configuration, the coefficients are sent less frequently than the channel state feedback is sent.

Each UE sends not only the decoder coefficients, but also the encoder coefficients. After receiving updated decoder/encoder coefficients from multiple UEs, the base station can learn common features from the feedback, and then make or propose to the UEs updates to the network coefficients. The coefficient updates can be for the decoder and/or the encoder.

Some users can have common properties. For example, five users sitting at the same coffee shop will have some similarities for channel state because they are in the same environment. Aspects of the present disclosure leverage these similarities to improve efficiencies for the base station and also for the UEs.

To leverage the similarities, the base station neural network extracts common parts and unique parts from the UE neural networks based on the received decoder and encoder coefficients. "Common parts" refers to layers and/or weights of layers of the neural network. Each layer of the neural network extracts a specific feature of the channel. For example, neighboring UEs may have similar weights in layer one and layer two, but different weights in layer three of their encoders. In this example, the common parts would be the weights of layers one and two.

The common parts can be transmitted to existing UEs and/or new UEs joining this base station as a serving cell. For example, the base station can determine common layers for a subset of UEs. The weights for those common layers can then be updated and transmitted to the UEs. That is, after the base station transmits the initial neural network structure, the base station can later identify common layers and transmit common layer weights to multiple UEs, such as a UE subset. Subsets may be defined as neighbors having common weights, for example, because of a common environment.

Subsets of the UEs may receive common layer weights that are associated with the other UEs of the subset. Referring to the previous example, new users entering the coffee shop where five other users are sitting may receive the common layer weights. By receiving the common layer weights, the subset of UEs can more efficiently learn decoder and encoder coefficients. That is, the base station can push the coefficients to the new user. The new user can start with those coefficients when training its neural network, to reduce the training process for the new UE. Another example of a new user in the coffee shop is a UE waking up from deep sleep or a UE receiving a new data burst.

Figure 7:
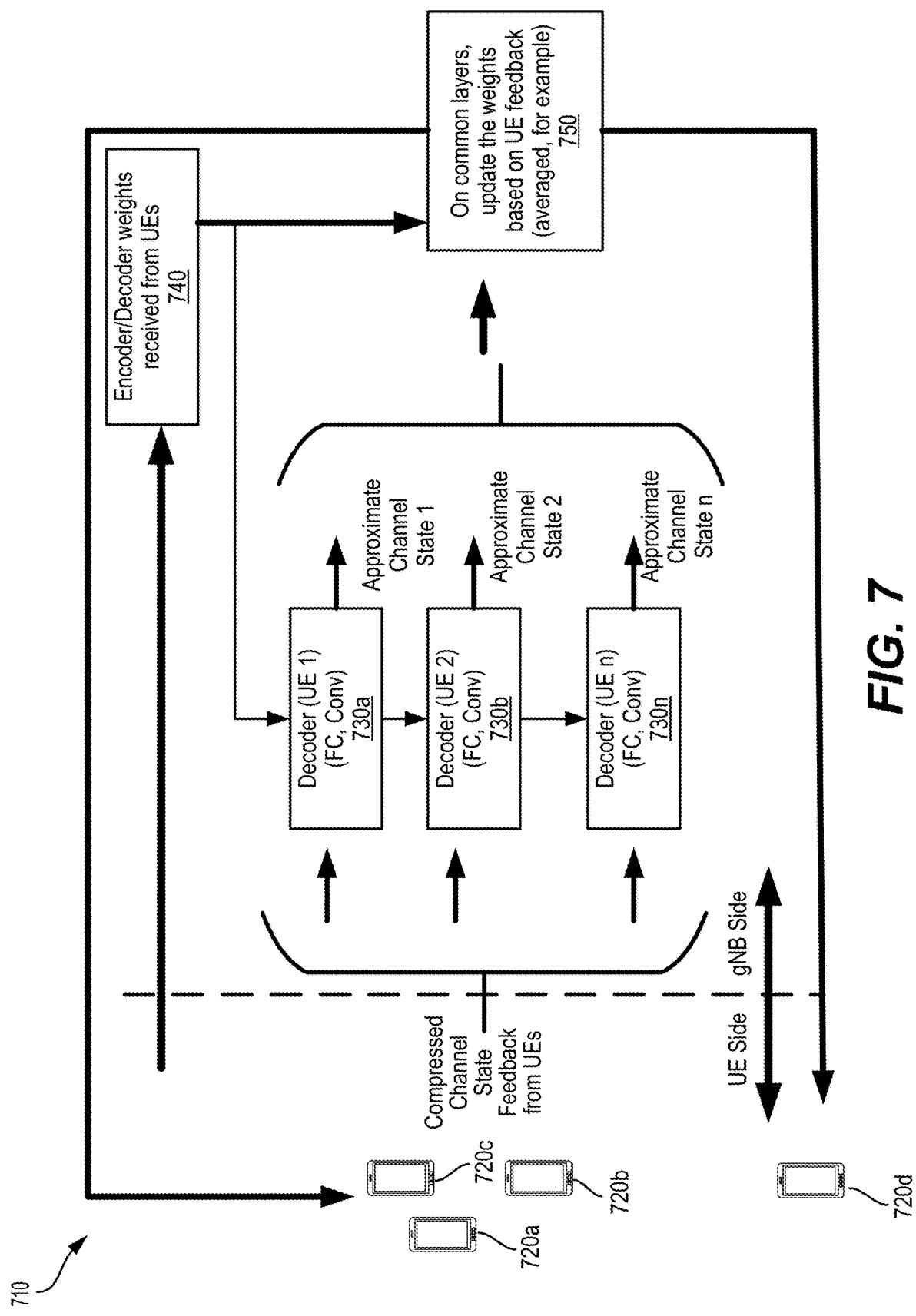
FIG. 7 illustrates a process for learning, in accordance with aspects of the present disclosure.

FIG. 7 illustrates a process for learning, in accordance with aspects of the present disclosure. A group of UEs 720a, 720b, 720c transmits compressed channel state feedback to a base station 710. The base station 710 has a decoder 730a-730n corresponding to each of the UEs 720a-c. The base station 710 also stores an encoder (not shown) for each UE 720a-c. Each decoder 730a-n decompresses the received channel state feedback to recover an approximated channel state 1—channel state n. The UEs 720a-c also periodically send encoder and decoder weights to the base station 710, as seen in block 740. The decoder weights can update the decoders 730a-n.

The base station 710 analyzes the received decoder weights and the encoder weights to extract common parts. That is, the base station 710 aggregates the information received from the UEs 720a-c and derives a new model, as seen in block 750. For example, the weights of common layers received from the various UEs 720a-c can be averaged. In one configuration, all weights from the common layers are averaged. In other configurations, only a portion of the weights from the common layer are averaged. The base station 710 pushes the updates (e.g., new model) to the UEs 720a-c to improve their learning of the encoder and decoder coefficients. The base station can also push the updates to new UEs (e.g., the UE 720d) to speed up training of the encoder and decoder coefficients at the new UE 720d.

Signaling changes can implement the federated channel state learning. For periodic transmissions, the base station can inform the UE of the frequency of the channel state feedback and also of the coefficient updates. For aperiodic transmissions, the base station can provide an uplink grant for uplink transmission of the coefficients. In case of scheduling conflicts, priority rules for physical uplink shared channel (PUSCH) feedback can be provided to the UE via RRC signaling. For example, the channel state feedback can be assigned a lowest priority.

A new UE capability is introduced for receiving neural network coefficients on a media access control-control element (MAC-CE) or physical downlink shared channel (PDSCH). The base station can transmit neural network (NN) coefficients to the UE on the PDSCH. Alternatively, a new MAC-CE can be provided for transmission of neural network coefficients. Not all UEs may have the capability to receive the updated network coefficients. Thus, a new mode can be introduced to enable UEs to receive the updated coefficients by decoding the new control element.

Figure 8:
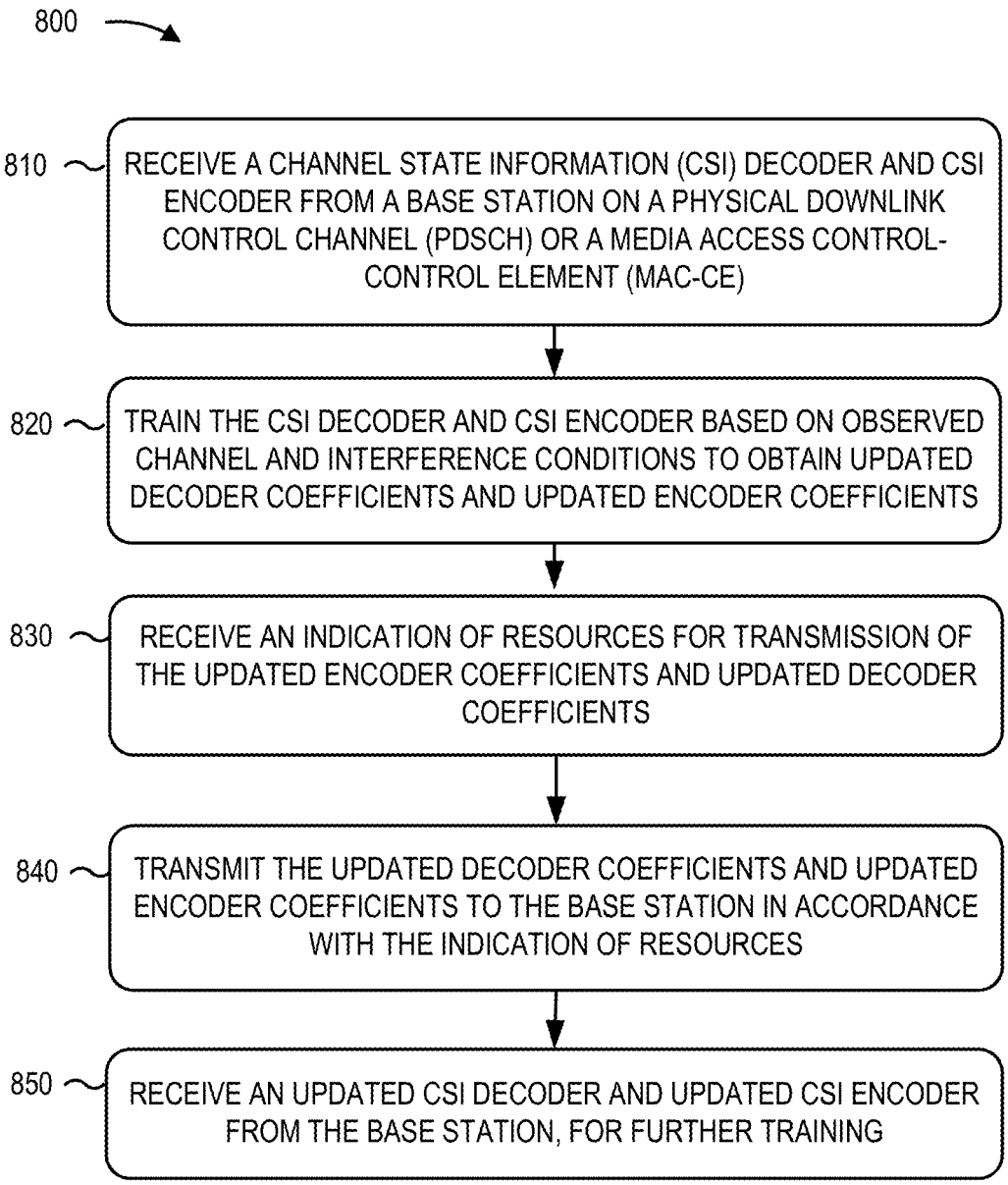
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. The example process 800 is an example of federated channel state information (CSI) learning.

As shown in FIG. 8, in some aspects, the process 800 may include receiving a channel state information (CSI) decoder and CSI encoder from a base station on a physical downlink control channel (PDSCH) or a media access control-control element (MAC-CE) (block 810). For example, the UE (e.g., using the antenna 252, DEMOD 254, MIMO detector 256, receive processor 258, controller/processor 280, memory 282, and/or the like) can receive a channel state information (CSI) decoder and CSI encoder from a base station.

As shown in FIG. 8, in some aspects, the process 800 may include training the CSI decoder and CSI encoder based on observed channel and interference conditions to obtain updated decoder coefficients and updated encoder coefficients (block 820). For example, the UE (e.g., using the controller/processor 280, memory 282, and/or the like) can train the CSI decoder and CSI encoder based on observed channel and interference conditions to obtain updated decoder coefficients and updated encoder coefficients.

As shown in FIG. 8, in some aspects, the process 800 may include receiving an indication of resources for transmission of the updated encoder coefficients and updated decoder coefficients (block 830). For example, the UE (e.g., using the antenna 252, DEMOD 254, MIMO detector 256, receive processor 258, controller/processor 280, memory 282, and/or the like) can receive an indication of resources for transmission of the updated encoder coefficients and updated decoder coefficients.

As shown in FIG. 8, in some aspects, the process 800 may include transmitting the updated decoder coefficients and updated encoder coefficients to the base station in accordance with the indication of resources (block 840). For example, the UE (e.g., using the antenna 252, DEMOD 254, TX MIMO processor 266, transmit processor 264, controller/processor 280, memory 282, and/or the like) can transmit the updated decoder coefficients and updated encoder coefficients to the base station in accordance with the indication of resources.

As shown in FIG. 8, in some aspects, the process 800 may include receiving an updated CSI decoder and updated CSI encoder from the base station, for further training (block 850). For example, the UE (e.g., using the antenna 252, DEMOD 254, MIMO detector 256, receive processor 258, controller/processor 280, memory 282, and/or the like) can receive an updated CSI decoder and updated CSI encoder.

Figure 9:
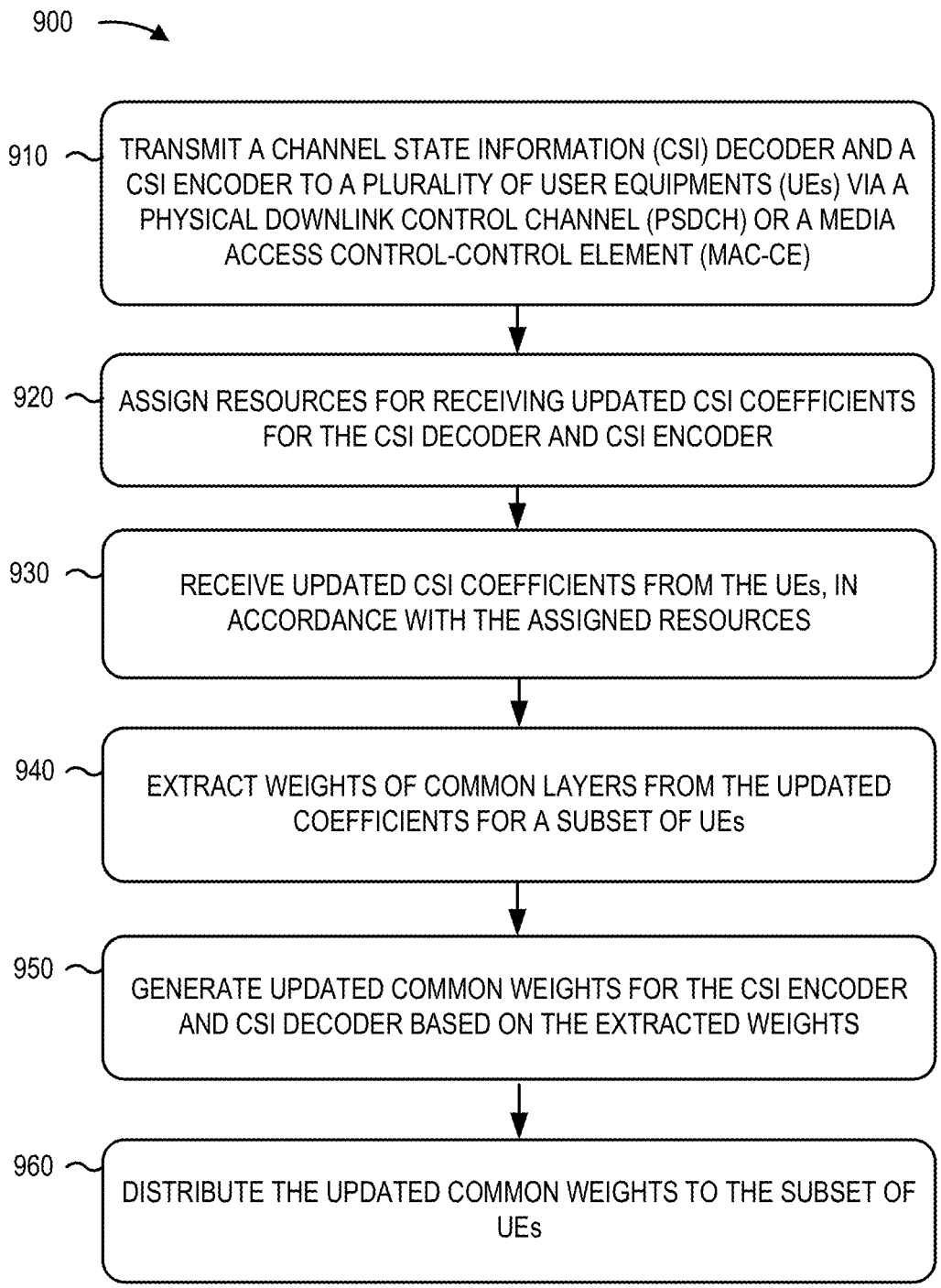
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. The example process 900 is an example of federated channel state information (CSI) learning.

As shown in FIG. 9, in some aspects, the process 900 may include transmitting a channel state information (CSI) decoder and a CSI encoder to multiple user equipments (UEs) via a physical downlink control channel (PSDCH) or a media access control-control element (MAC-CE) (block 910). For example, a base station (e.g., using the antenna 234, MOD 232, TX MIMO processor 230, transmit processor 220, controller/processor 240, memory 242, and/or the like) can transmit a channel state information (CSI) decoder and a CSI encoder to user equipments (UEs).

As shown in FIG. 9, in some aspects, the process 900 may include assigning resources for receiving updated CSI coefficients for the CSI decoder and CSI encoder (block 920). For example, a base station (e.g., using the controller/processor 240, memory 242, and/or the like) can assign resources for receiving updated CSI coefficients for the CSI decoder and CSI encoder.

As shown in FIG. 9, in some aspects, the process 900 may include receiving updated CSI coefficients from the UEs, in accordance with the assigned resources (block 930). For example, a base station (e.g., using the antenna 234, MOD 232, MIMO detector 236, receive processor 238, controller/processor 240, memory 242, and/or the like) can receive updated CSI coefficients from the UEs, in accordance with the assigned resources.

As shown in FIG. 9, in some aspects, the process 900 may include extracting weights of common layers associated with the updated coefficients for a subset of UEs (block 940). For example, a base station (e.g., using the controller/processor 240, memory 242, and/or the like) can extract weights of common layers. The base station may even employ separate neural networks for these purposes.

As shown in FIG. 9, in some aspects, the process 900 may include generating updated common weights for the CSI encoder and CSI decoder based on the extracted weights (block 950). For example, a base station (e.g., using the controller/processor 240, memory 242, and/or the like) can generate updated common weights based on the extracted weights.

As shown in FIG. 9, in some aspects, the process 900 may include distributing the updated common weights to the subset of UEs (block 960). For example, a base station (e.g., using the antenna 234, MOD 232, TX MIMO processor 230, transmit processor 220, controller/processor 240, memory 242, and/or the like) can distribute the updated common weights.

Implementation examples are described in the following numbered clauses:

Implementation examples are described in the following numbered clauses:

1. A method of wireless communications by a user equipment (UE), comprising:
   receiving a channel state information (CSI) decoder and CSI encoder from a base station on physical downlink control channel (PDSCH) or a media access control-control element (MAC-CE);
   training the CSI decoder and CSI encoder based on observed channel and interference conditions to obtain updated decoder coefficients and updated encoder coefficients;
   receiving an indication of resources for transmission of the updated encoder coefficients and the updated decoder coefficients;
   transmitting the updated decoder coefficients and the updated encoder coefficients to the base station in accordance with the indication of resources; and
   receiving an updated CSI decoder and updated CSI encoder from the base station, for further training.

2. The method of clause 1, further comprising receiving via radio resource control (RRC) signaling a conflict priority assigned for transmitting the updated decoder coefficients and the updated encoder coefficients.

3. The method of either clause 1 or 2, further comprising transmitting CSI feedback, which is output from the updated CSI encoder, and also the updated encoder coefficients and the updated decoder coefficients, according to timelines configured through RRC signaling.

4. The method of any of the preceding clauses, in which the indication of resources comprises an uplink grant or parameters for periodic transmissions.

5. A method of wireless communications by a base station, comprising:
transmitting a channel state information (CSI) decoder and a CSI encoder to a plurality of user equipments (UEs) via a physical downlink control channel (PSDCH) or a media access control-control element (MAC-CE);
assigning resources for receiving updated CSI coefficients for the CSI decoder and CSI encoder;
receiving the updated CSI coefficients from the plurality of UEs, in accordance with the assigned resources;
extracting weights of common layers associated with the updated coefficients for a subset of UEs;
generating updated common weights for the CSI encoder and CSI decoder based on the extracted weights; and
distributing the updated common weights to the subset of UEs.

6. The method of clause 5, in which the subset of UEs includes a new user.

7. The method of either clause 5 or 6, in which the subset of UEs comprises existing users receiving a new data burst.

8. An apparatus of a user equipment (UE) for wireless communication, comprising:
a memory, and
one or more processors operatively coupled to the memory, the memory and the one or more processors configured:
to receive a channel state information (CSI) decoder and CSI encoder from a base station on physical downlink control channel (PDSCH) or a media access control-control element (MAC-CE);
to train the CSI decoder and CSI encoder based on observed channel and interference conditions to obtain updated decoder coefficients and updated encoder coefficients;
to receive an indication of resources for transmission of the updated encoder coefficients and the updated decoder coefficients;
to transmit the updated decoder coefficients and the updated encoder coefficients to the base station in accordance with the indication of resources; and
to receive an updated CSI decoder and updated CSI encoder from the base station, for further training.

9. The apparatus of clause 8, in which the one or more processors are further configured to receive via radio resource control (RRC) signaling a conflict priority assigned for transmitting the updated decoder coefficients and the updated encoder coefficients.

10. The apparatus of either clause 8 or 9, in which the one or more processors are further configured to transmit CSI feedback, which is output from the updated CSI encoder, and also the updated encoder coefficients and the updated decoder coefficients, according to timelines configured through RRC signaling.

11. The apparatus of any of the clauses 8-10, in which the indication of resources comprises an uplink grant or parameters for periodic transmissions.

12. An apparatus of a base station for wireless communication comprising:
a memory, and
one or more processors operatively coupled to the memory, the memory and the one or more processors configured:
to transmit a channel state information (CSI) decoder and a CSI encoder to a plurality of user equipments (UEs) via a physical downlink control channel (PSDCH) or a media access control-control element (MAC-CE);
to assign resources for receiving updated CSI coefficients for the CSI decoder and CSI encoder;
to receive the updated CSI coefficients from the plurality of UEs, in accordance with the assigned resources;
to extract weights of common layers associated with the updated coefficients for a subset of UEs;
to generate updated common weights for the CSI encoder and CSI decoder based on the extracted weights; and
to distribute the updated common weights to the subset of UEs.

13. The apparatus of clause 12, in which the subset of UEs includes a new user.

14. The apparatus of either clause 13 or 12, in which the subset of UEs comprises existing users receiving a new data burst.

15. A user equipment (UE) for wireless communication comprising:
means for receiving a channel state information (CSI) decoder and CSI encoder from a base station on physical downlink control channel (PDSCH) or a media access control-control element (MAC-CE);
means for training the CSI decoder and CSI encoder based on observed channel and interference conditions to obtain updated decoder coefficients and updated encoder coefficients;
means for receiving an indication of resources for transmission of the updated encoder coefficients and the updated decoder coefficients;
means for transmitting the updated decoder coefficients and the updated encoder coefficients to the base station in accordance with the indication of resources; and
means for receiving an updated CSI decoder and updated CSI encoder from the base station, for further training.

16. The UE of clause 15, further comprising means for receiving via radio resource control (RRC) signaling a conflict priority assigned for transmitting the updated decoder coefficients and the updated encoder coefficients.

17. The UE of either clause 15 or 16, further comprising means for transmitting CSI feedback, which is output from the updated CSI encoder, and also the updated encoder coefficients and the updated decoder coefficients, according to timelines configured through RRC signaling.

18. The UE of any of the clauses 15-17, in which the indication of resources comprises an uplink grant or parameters for periodic transmissions.

19. A base station for wireless communication, comprising:
- means for transmitting a channel state information (CSI) decoder and a CSI encoder to a plurality of user equipments (UEs) via a physical downlink control channel (PSDCH) or a media access control-control element (MAC-CE);
- means for assigning resources for receiving updated CSI coefficients for the CSI decoder and CSI encoder;
- means for receiving the updated CSI coefficients from the plurality of UEs, in accordance with the assigned resources;
- means for extracting weights of common layers associated with the updated coefficients for a subset of UEs;
- means for generating updated common weights for the CSI encoder and CSI decoder based on the extracted weights; and
- means for distributing the updated common weights to the subset of UEs.

20. The base station of clause 19, in which the subset of UEs includes a new user.

21. The base station of either clause 19 or 20, in which the subset of UEs comprises means for existing users receiving a new data burst.

22. A non-transitory computer-readable medium storing code for wireless communications, the code comprising instructions executable by a processor to perform a method of any of clauses 1 to 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
   - receiving a channel state information (CSI) decoder model and a CSI encoder model from a base station on physical downlink shared channel (PDSCH) or a media access control-control element (MAC-CE);
   - training the CSI decoder model and the CSI encoder model based on observed channel and interference conditions to obtain updated decoder coefficients and updated encoder coefficients;
   - receiving an indication of resources for transmission of the updated encoder coefficients and the updated decoder coefficients;
   - transmitting the updated decoder coefficients and the updated encoder coefficients to the base station in accordance with the indication of resources; and
   - receiving an updated CSI decoder model and updated CSI encoder model from the base station, for further training.

2. The method of claim 1, further comprising receiving via radio resource control (RRC) signaling a conflict priority assigned for transmitting the updated decoder coefficients and the updated encoder coefficients.

3. The method of claim 1, further comprising transmitting CSI feedback, which is output from the updated CSI encoder model, and also the updated encoder coefficients and the updated decoder coefficients, according to timelines configured through RRC signaling.

4. The method of claim 1, in which the indication of resources comprises an uplink grant or parameters for periodic transmissions.

5. A method of wireless communications by a base station, comprising:
   - transmitting a channel state information (CSI) decoder model and a CSI encoder model to a plurality of user equipments (UEs) via a physical downlink shared channel (PDSCH) or a media access control-control element (MAC-CE);
   - assigning resources for receiving updated CSI coefficients for the CSI decoder model and the CSI encoder model;
   - receiving the updated CSI coefficients from the plurality of UEs, in accordance with the assigned resources;
   - extracting weights of common layers associated with the updated coefficients for a subset of UEs;

generating updated common weights for the CSI encoder model and CSI decoder model based on the extracted weights; and distributing the updated common weights to the subset of UEs.

6. The method of claim 5, in which the subset of UEs includes a new user.

7. The method of claim 5, in which the subset of UEs comprises existing users receiving a new data burst.

8. An apparatus of a user equipment (UE) for wireless communication, comprising:
a memory, and
one or more processors coupled to the memory, the memory and the one or more processors configured:
to receive a channel state information (CSI) decoder model and a CSI encoder model from a base station on physical downlink shared channel (PDSCH) or a media access control-control element (MAC-CE);
to train the CSI decoder model and the CSI encoder model based on observed channel and interference conditions to obtain updated decoder coefficients and updated encoder coefficients;
to receive an indication of resources for transmission of the updated encoder coefficients and the updated decoder coefficients;
to transmit the updated decoder coefficients and the updated encoder coefficients to the base station in accordance with the indication of resources; and
to receive an updated CSI decoder model and updated CSI encoder model from the base station, for further training.

9. The apparatus of claim 8, in which the one or more processors are further configured to receive via radio resource control (RRC) signaling a conflict priority assigned for transmitting the updated decoder coefficients and the updated encoder coefficients.

10. The apparatus of claim 8, in which the one or more processors are further configured to transmit CSI feedback, which is output from the updated CSI encoder model, and also the updated encoder coefficients and the updated decoder coefficients, according to timelines configured through RRC signaling.

11. The apparatus of claim 8, in which the indication of resources comprises an uplink grant or parameters for periodic transmissions.

12. An apparatus of a base station for wireless communication comprising:
a memory, and
one or more processors coupled to the memory, the memory and the one or more processors configured:
to transmit a channel state information (CSI) decoder model and a CSI encoder model to a plurality of user equipments (UEs) via a physical downlink shared channel (PDSCH) or a media access control-control element (MAC-CE);
to assign resources for receiving updated CSI coefficients for the CSI decoder model and the CSI encoder model;
to receive the updated CSI coefficients from the plurality of UEs, in accordance with the assigned resources;
to extract weights of common layers associated with the updated coefficients for a sub set of UEs;
to generate updated common weights for the CSI encoder model and CSI decoder model based on the extracted weights; and
to distribute the updated common weights to the subset of UEs.

13. The apparatus of claim 12, in which the subset of UEs includes a new user.

14. The apparatus of claim 12, in which the subset of UEs comprises existing users receiving a new data burst.

15. A user equipment (UE) for wireless communication comprising:
means for receiving a channel state information (CSI) decoder model and a CSI encoder model from a base station on physical downlink shared channel (PDSCH) or a media access control-control element (MAC-CE);
means for training the CSI decoder model and the CSI encoder model based on observed channel and interference conditions to obtain updated decoder coefficients and updated encoder coefficients;
means for receiving an indication of resources for transmission of the updated encoder coefficients and the updated decoder coefficients;
means for transmitting the updated decoder coefficients and the updated encoder coefficients to the base station in accordance with the indication of resources; and
means for receiving an updated CSI decoder model and updated CSI encoder model from the base station, for further training.

16. The UE of claim 15, further comprising means for receiving via radio resource control (RRC) signaling a conflict priority assigned for transmitting the updated decoder coefficients and the updated encoder coefficients.

17. The UE of claim 15, further comprising means for transmitting CSI feedback, which is output from the updated CSI encoder model, and also the updated encoder coefficients and the updated decoder coefficients, according to timelines configured through RRC signaling.

18. The UE of claim 15, in which the indication of resources comprises an uplink grant or parameters for periodic transmissions.

19. A base station for wireless communication, comprising:
means for transmitting a channel state information (CSI) decoder model and a CSI encoder model to a plurality of user equipments (UEs) via a physical downlink shared channel (PDSCH) or a media access control-control element (MAC-CE);
means for assigning resources for receiving updated CSI coefficients for the CSI decoder model and the CSI encoder model;
means for receiving the updated CSI coefficients from the plurality of UEs, in accordance with the assigned resources;
means for extracting weights of common layers associated with the updated coefficients for a subset of UEs;
means for generating updated common weights for the CSI encoder model and CSI decoder model based on the extracted weights; and
means for distributing the updated common weights to the subset of UEs.

20. The base station of claim 19, in which the subset of UEs includes a new user.

21. The base station of claim 19, in which the subset of UEs comprises means for existing users receiving a new data burst.

* * * * *